June 23, 1925.
W. E. WENTWORTH
WELL PULLING MACHINERY
Filed Dec. 7, 1923
1,543,269
3 Sheets-Sheet 1
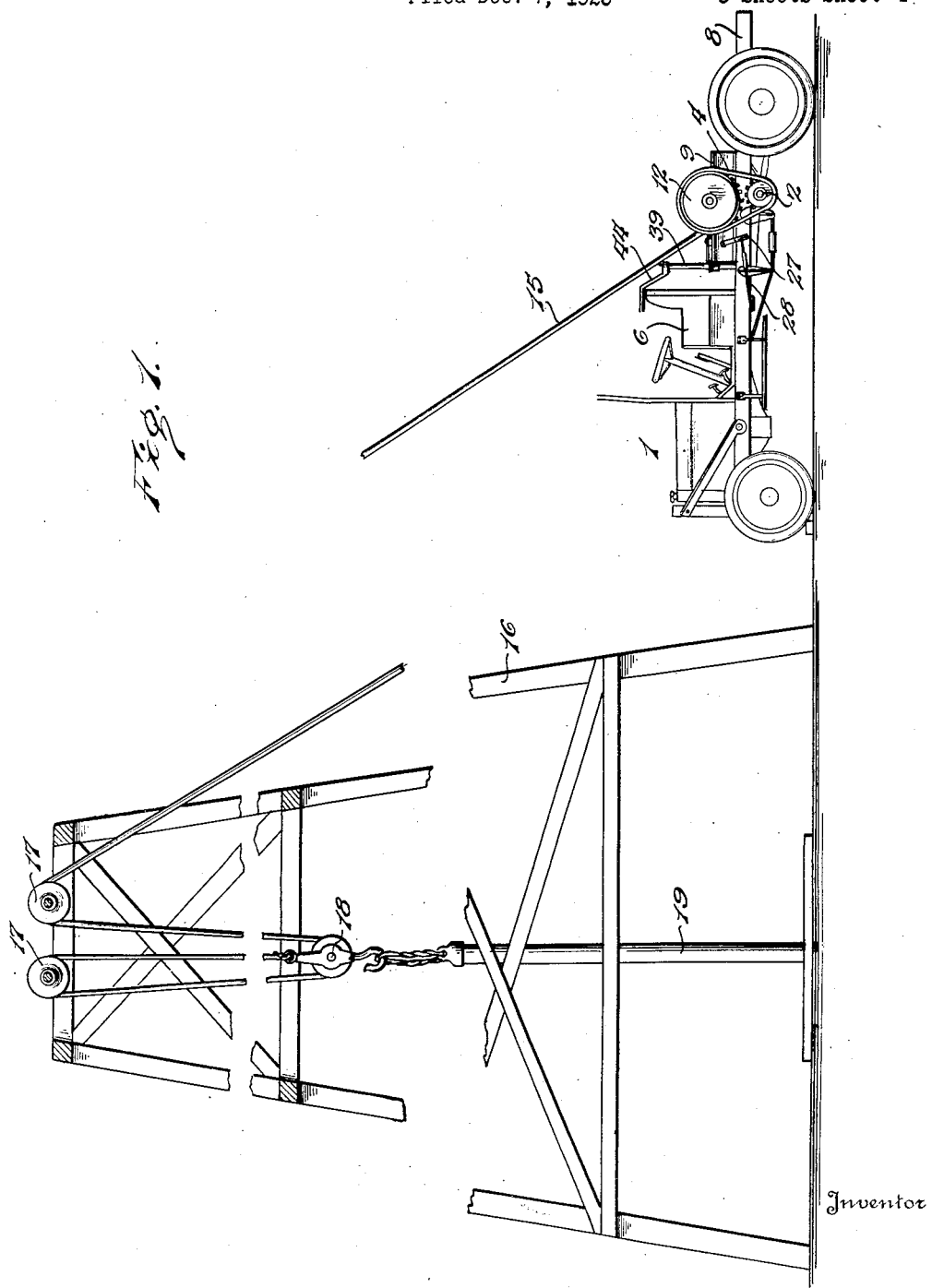

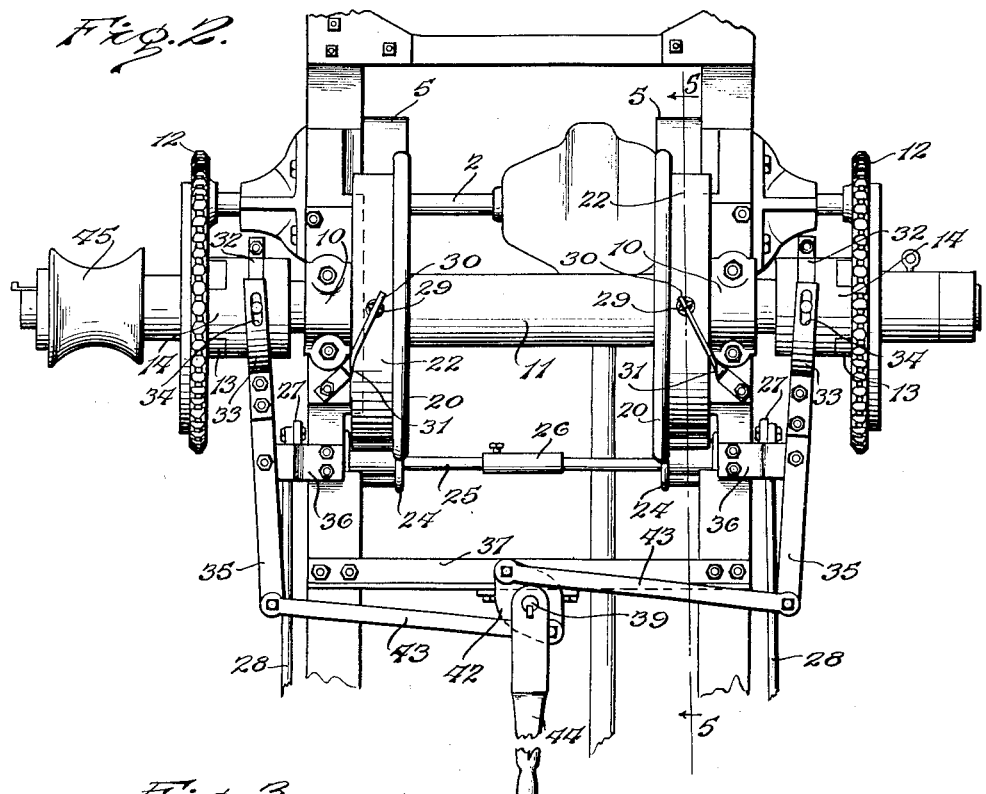
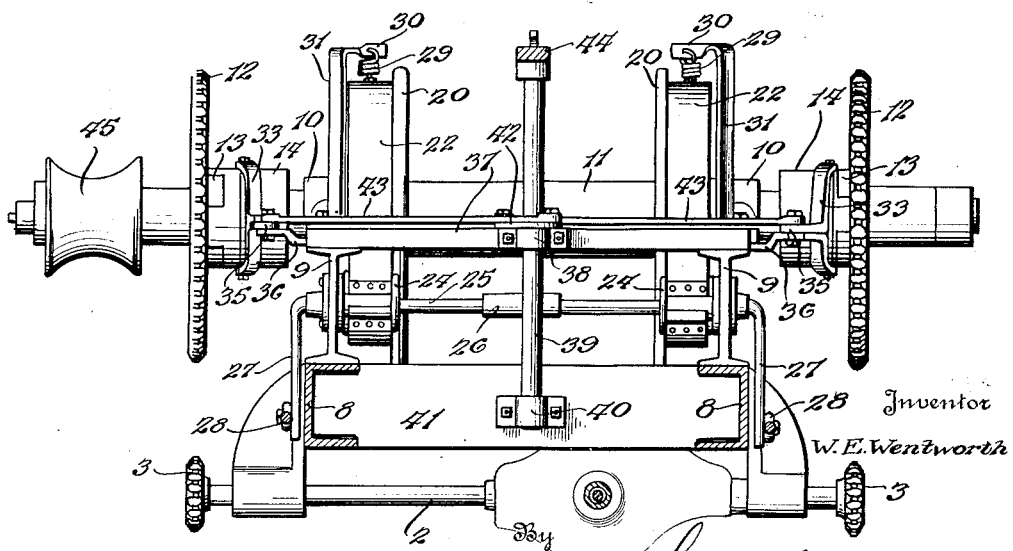

June 23, 1925.  
W. E. WENTWORTH  
WELL PULLING MACHINERY  
Filed Dec. 7, 1923  
3 Sheets-Sheet 3
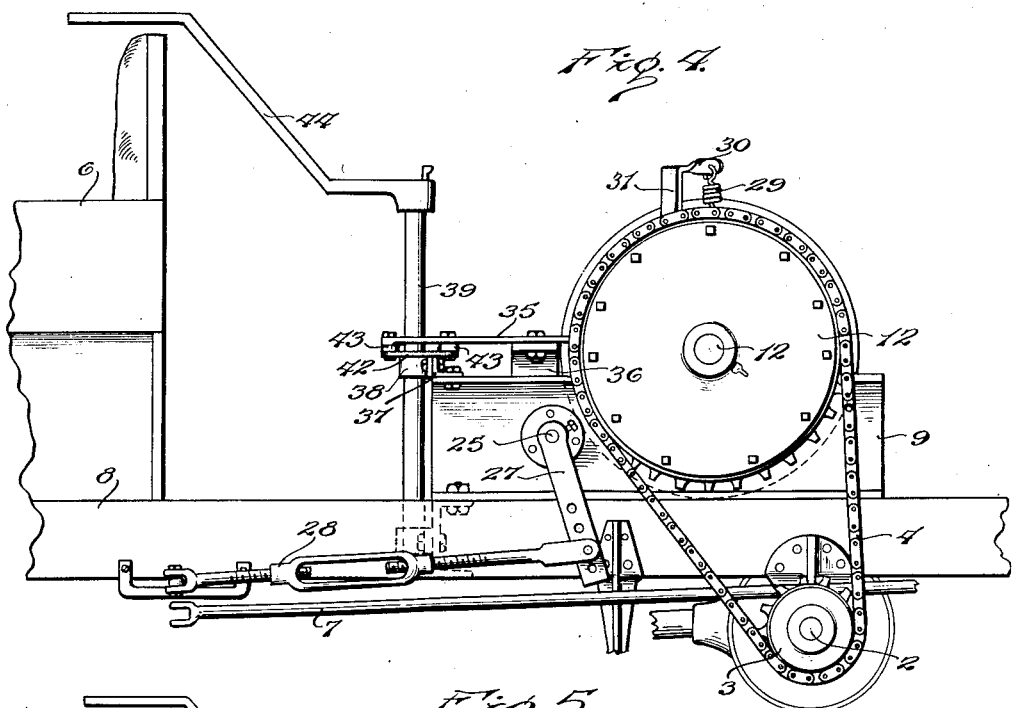
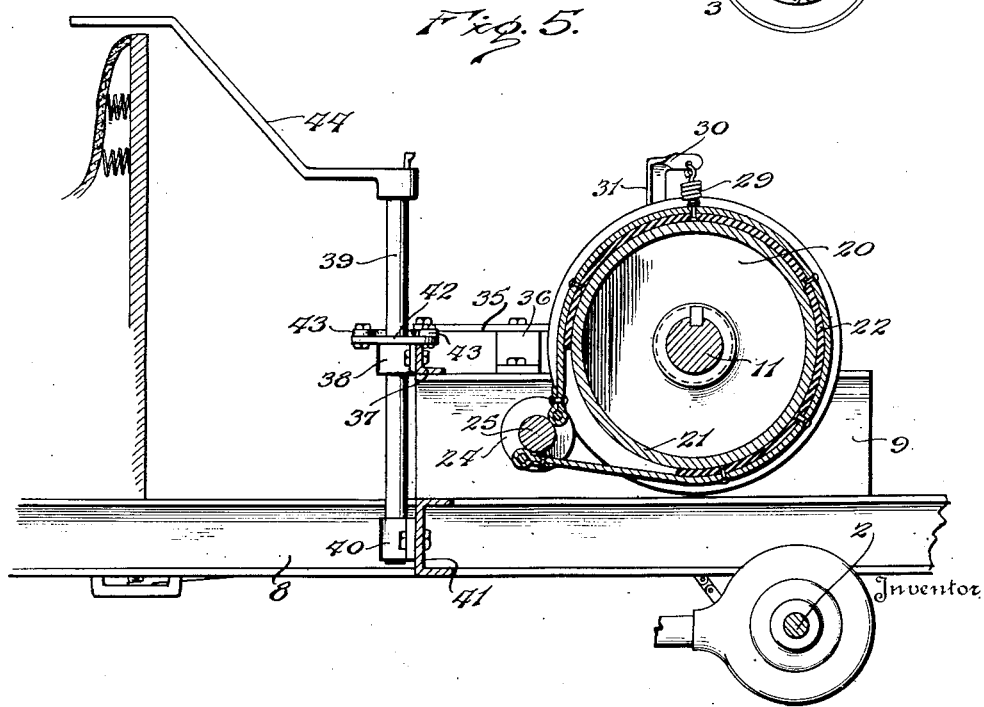

Patented June 23, 1925.

UNITED STATES PATENT OFFICE.

WILLIAM E. WENTWORTH, OF SAN ANTONIO, TEXAS.

WELL PULLING MACHINERY.

Application filed December 7, 1923. Serial No. 679,216.

*To all whom it may concern:*

Be it known that I, WILLIAM E. WENTWORTH, a citizen of the United States, residing at San Antonio, in the county of Bexar and State of Texas, have invented certain new and useful Improvements in Well Pulling Machinery, of which the following is a specification.

My invention relates to means for pulling casings and rods from oil and gas wells and seeks to provide a compact, simple, efficient and easily controlled mechanism which may be readily transported to the point of use and there quickly brought into operative position. The invention provides a hoisting mechanism mounted upon a self-propelled truck which can be arranged to perform the hoisting operation by merely shifting one element of the propelling mechanism without involving any change in the structure of the truck. The invention is illustrated in the accompanying drawings and will be hereinafter fully set forth.

In the drawings:

Figure 1 is a side elevation showing my improved mechanism arranged for use in pulling a well;

Fig. 2 is an enlarged plan view of the winding drum and the parts associated therewith;

Fig. 3 is a front elevation of the same with parts in transverse section;

Fig. 4 is a side elevation;

Fig. 5 is a longitudinal section on the line 5—5 of Fig. 2.

In the drawings, the reference numeral 1 indicates a motor truck which may be of any preferred model and should be heavy enough to dispense with supplemental anchoring means when it is to be used for pulling a well. I have employed my invention upon a truck equipped with a transverse shaft 2 connected by suitable driving gearing with the motor of the truck and provided at its ends with sprocket pinions 3 which are normally connected by chains 4 with cooperating sprockets upon the rear axle. A chain and corresponding sprockets and pinions are provided on each side of this type of truck so that it may be easily propelled even though carrying a heavy load. The driving shaft 2 is equipped with brakes, indicated conventionally at 5 in Fig. 4, which are controlled by a foot pedal mounted adjacent the operator's seat which is indicated at 6. The truck is also provided with brakes (not shown) upon the rear axle or secured to the rear ground wheels, and these brakes are ordinarily controlled by a connecting rod 7 actuated through a hand lever and suitable connections from the seat 6. The parts which have been mentioned are standard truck construction and are referred to only to such extent as will aid in understanding the invention.

In carrying out my present invention, I secure upon the side bars 8 of the truck frame pillars or beams 9 located in advance of the rear axle and over the power shaft 2. Upon these pillars or beams 9 are mounted suitable bearings 10 in which a drum shaft 11 is journaled. At points outwardly beyond the supporting blocks 9, sprockets 12 are loosely mounted upon the drum shaft and, when the hoisting mechanism is to be operated, the chains 4 are removed from the sprockets on the rear axle of the truck and then trained around the said sprockets 12, as shown in Figs. 1 and 4, so that the rotation of the power shaft 2 and the pinions 3 will be transmitted to the said sprockets 12. The sprockets 12 may be held against movement longitudinally of the drum shaft by any preferred means, and on their inner sides they are provided with clutch hubs 13 adapted to be engaged with clutch sleeves 14 which are slidably mounted upon the drum shaft 11 but constrained to rotate therewith. When the clutch sleeves are slid outwardly so as to engage the clutch hubs, the rotation of the sprockets will be transmitted to the clutch sleeves 14 and through them to the drum shaft so that the cable 15 which is attached to the shaft will be wound thereon. This cable is carried to the top of the derrick, indicated at 16, and is there trained around idler pulleys 17 and attached to a grapple or hoisting hook 18. This hoisting hook is connected in the usual manner with the upper end of the rod or tubing to be pulled, which is indicated at 19. In Fig. 1 of the accompanying drawings, I have illustrated the hoisting cable as carried back and forth over several idler pulleys, and this arrangement is employed when hoisting a heavy load. It is possible, however, to raise light loads by merely carrying the cable directly to and over a single idler pulley and then directly to the part which is to be withdrawn from the well.

The winding drum is defined by end disks or circular plates 20 which are fixed to the drum shaft, and upon their outer faces these disks or end plates are constructed with annular flanges or rims 21 which constitute brake drums. Brake bands 22 are disposed around these flanges or brake drums and each band is secured at its ends to diametrically opposite points of a disk or collar 24 which is secured to a brake shaft 25. The brake shaft 25 is journaled in the pillar blocks or beams 9 and is preferably constructed in two sections axially alined and joined at their inner ends by a coupling sleeve 26, this construction facilitating the assembling of the parts. The ends of the brake shaft 25 are equipped with cranks or levers 27 to which are pivotally attached connecting rods 28. When the well-pulling mechanism is to operate, I disconnect brake rod or rods 7 from the actuating elements and the connecting rods 28 are then attached to said elements, as shown in Fig. 4, so that, if the controlling hand lever be actuated, the brake bands 22 will be clamped about the brake drums or rims 21 and the drum shaft will be held against rotation and the load upon the hoisting cable will be firmly supported. To prevent accidental application of the brakes, each brake band is supported normally out of contact with the brake drum by a coiled spring 29 attached to the band at its highest point, as shown in Figs. 4 and 5, and suspended on the upper end 30 of a standard or post 31 rising from the adjacent pillar block 9.

The clutch sleeves 14 are encircled by collars 32, and these collars have pin and slot connection with forks 33, as shown at 34, whereby rocking of the forks will effect movement of the clutch sleeves longitudinally of the drum shaft 11. The forks 33 are formed on or secured to the rear ends of levers or rocking arms 35 which are pivoted upon brackets 36 secured upon the upper sides of the pillar blocks 9, as shown and as will be understood. At or near the front ends of the pillar blocks 9 is secured a cross bar 37 carrying at its center on its front side a bearing 38 in which is rotatably mounted a vertical shaft 39 having its lower end supported in a stepped bearing or bracket 40 upon a cross bar 41 which is secured to and extends between the side bars 8 of the truck frame. Secured to the shaft 39 and resting upon the bearing 38 is a two-armed lever or crank plate 42 which extends to the opposite sides of the shaft, as shown clearly in Fig. 2. At diametrically opposite points of this crank plate, I pivot the inner ends of links 43 which have their outer ends pivoted to the forward ends of the levers or rocking arms 34 whereby the said levers will be simultaneously rocked in opposite directions if the shaft 39 be rocked. A hand lever or handle bar 44 is secured to the upper end of the shaft 39 and extends therefrom over the back of the operator's seat so that it may be easily reached and manipulated by him. In one position of the said handle bar, the clutch sleeves will be engaged with the respectively adjacent clutch hubs and the drum shaft will be rotated so as to wind the cable thereon. When it is desired to permit the cable to descend to be coupled to a lower section of the tubing, the handle bar is merely swung to one side so as to rock the levers 35 and withdraw the clutch sleeves from their engagement with the clutch hubs, whereupon the drum will rotate freely and permit the cable to unwind. If it be desired to hold the drum against rotation so that the cable and the rod attached thereto will be held stationary, the brake lever is applied so as to set the brake bands 22 against the brake drums 21 and thereby hold the load. Ordinarily, this will be sufficient, but, if the load should be very heavy, the brakes 5 upon the power shaft 2 may be also applied and the power shaft will be thereby held against rotation, it being understood, of course, that the motor is stopped or thrown out of gear.

It may sometimes be desired to lift a very light load or to draw an object toward the truck or to permit a cable to be wound or unwound at a different speed than is possible by using the main drum. To serve these purposes, I provide a small hoisting pulley 45 secured in any convenient manner upon one end of the drum shaft.

It is thought the uses and advantages of my apparatus will be readily understood from the foregoing description, taken in connection with the accompanying drawings. The truck may be driven from point to point in the usual manner as long as the chains 4 are trained about the sprockets upon the rear axle or the rear ground wheels. On arrival at the point of use, the chains are rearranged so as to pass around the sprockets 12 on the drum shaft and the connecting rod or rods 28 substituted for the usual brake rod or rods 7, whereupon the mechanism may be actuated to hoist tubing from a well and controlled by the operator in exactly the same manner as if he was driving the truck over a road. The operator will face forwardly upon the seat 6 and, unless some accident should happen, will not be required to turn in the seat and look backward over the winding drum, the handle bar 44 projecting over the back of the seat so that it may be easily reached by the operator upon the seat. The brakes are controlled in exactly the same manner as if the truck were traveling and the arrangement provides four brakes so that the braking force may be applied through the power shaft, through the drum shaft, or through both shafts as circumstances may demand. The device is compactly arranged and easily controlled and has proven highly efficient in actual use.

Having thus described the invention, I claim:

1. In combination with a motor truck, a drum shaft mounted thereon, sprockets loosely fitted upon the drum shaft and adapted to be operatively connected with the power plant of the truck, clutches mounted upon the drum shaft and adapted to lock the sprockets thereto, levers supported for oscillation in advance of the drum shaft and controlling the clutches, a vertically disposed rock shaft supported upon the truck between said levers, means whereby the said shaft may be rocked from the seat upon the truck, and link connections between the said levers and the said shaft.

2. The combination with a motor truck, of pillar blocks secured thereon, a drum shaft mounted upon said blocks, sprockets loosely fitted upon the said shaft and adapted to be connected with the power plant of the truck, clutches slidably mounted upon the drum shaft and adapted to lock the sprockets thereto, a cross bar connecting the pillar blocks, levers mounted for oscillation upon the pillar blocks and operatively connected with the clutches, a vertically disposed shaft supported by bearings upon the truck and upon the said cross bar, oppositely extending cranks secured upon said shaft, links connecting said cranks with the said levers, and a handle bar secured to the upper end of said shaft and projecting forwardly therefrom over the seat of the truck.

In testimony whereof I affix my signature.

WILLIAM E. WENTWORTH. [L. S.]